(No Model.) 2 Sheets—Sheet 1.
C. EDGAR.
BAND SAW MILL.
No. 532,772. Patented Jan. 22, 1895.
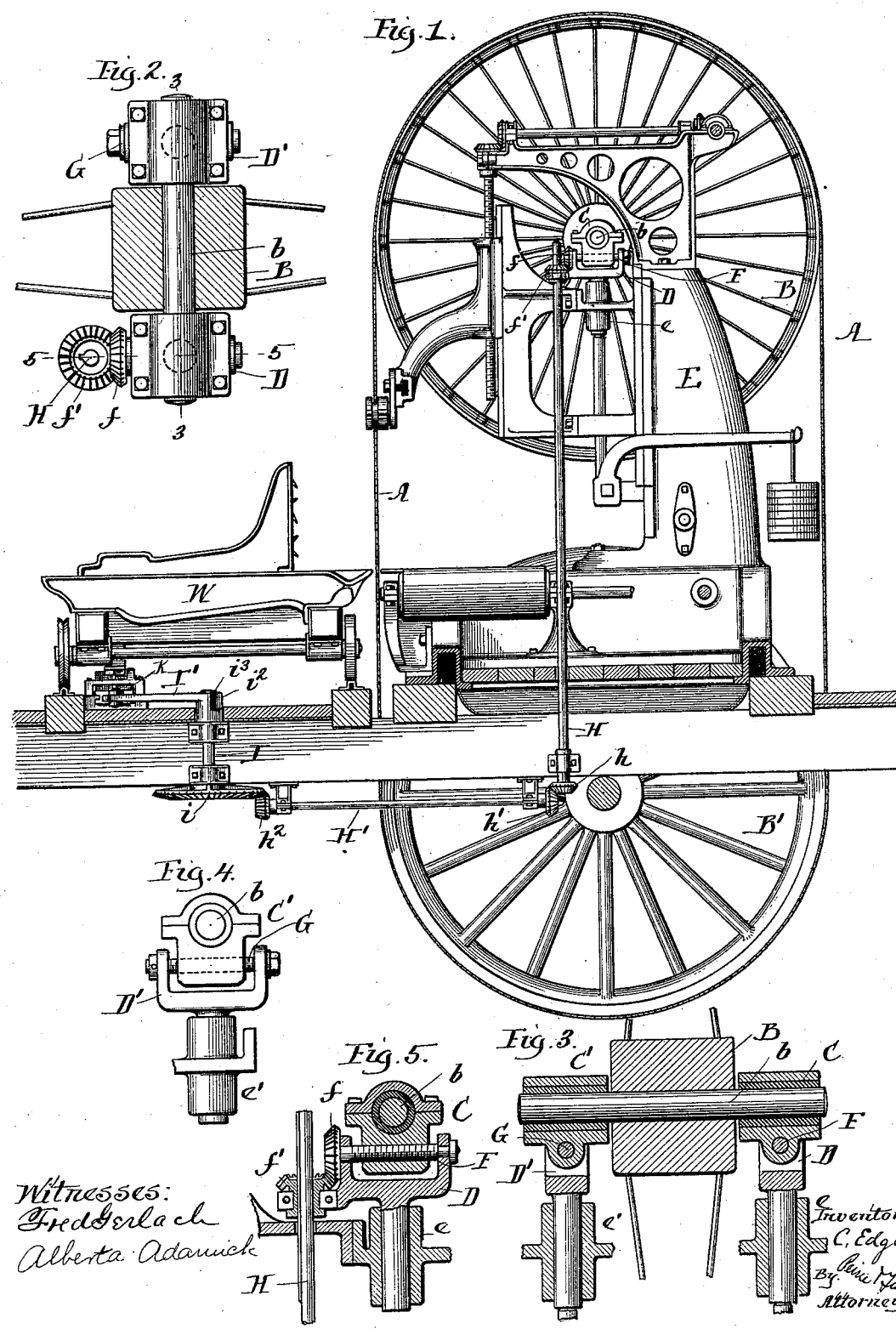
Witnesses:
Fred Gerlach
Alberta Adamick
Inventor:
C. Edgar
By
Attorneys

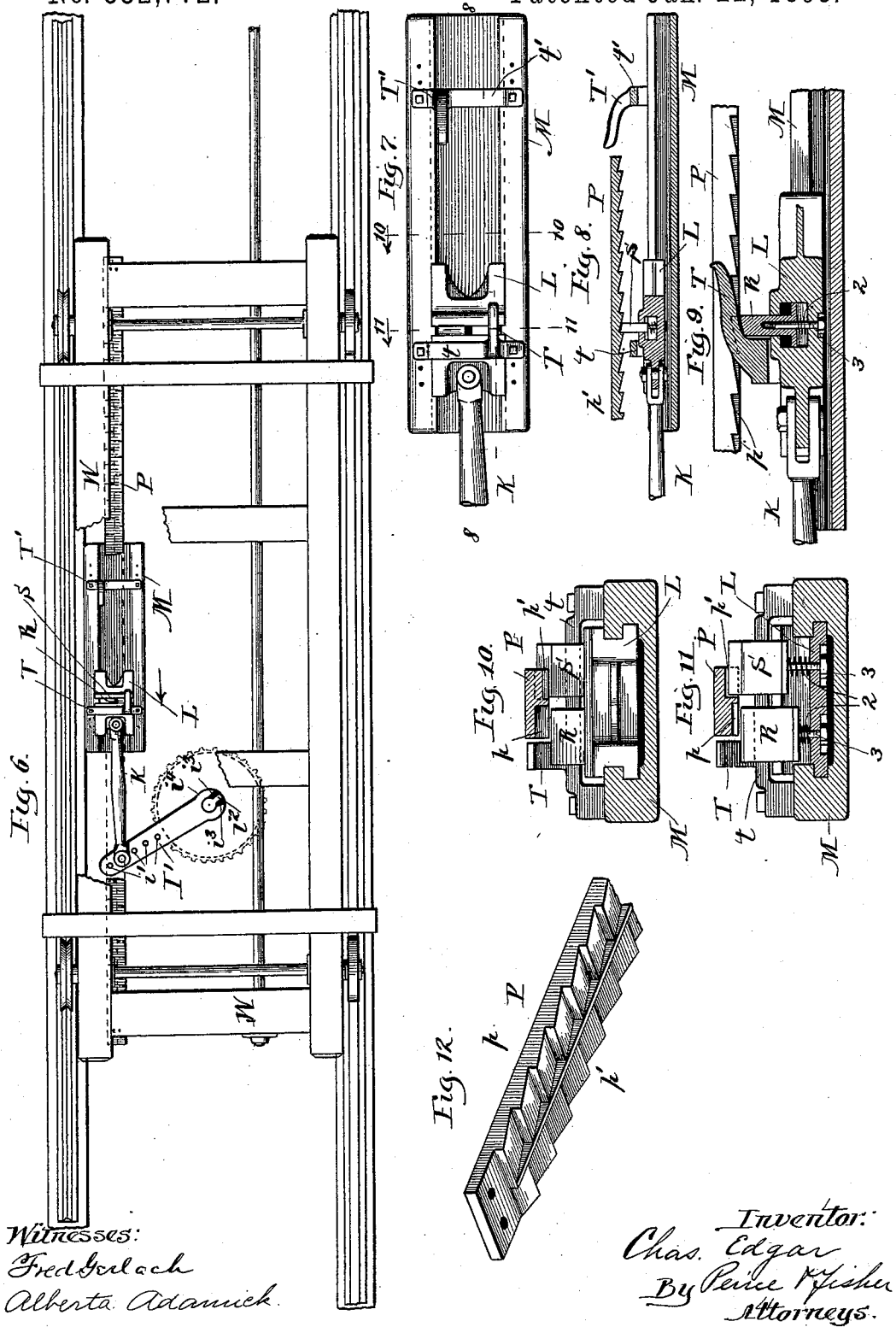

UNITED STATES PATENT OFFICE.

CHARLES EDGAR, OF WAUSAU, WISCONSIN.

BAND-SAW MILL.

SPECIFICATION forming part of Letters Patent No. 532,772, dated January 22, 1895.

Application filed August 25, 1894. Serial No. 521,315. (No model.)

*To all whom it may concern:*

Be it known that I, CHARLES EDGAR, a citizen of the United States, residing at Wausau, in the county of Marathon, State of Wisconsin, have invented certain new and useful Improvements in Band-Saw Mills, of which I do declare the following to be a full, clear, and exact description, reference being had to the accompanying drawings, forming a part of this specification.

My present invention has relation to that class of band saw mills in which the band wheels carry two sets of saw teeth for the purpose of cutting the lumber both upon the forward and return movement of the log carriage.

In the operation of band saws it is found that if both band wheels be arranged with their peripheries in true line with the path of travel of the log carriage there is a tendency of the band saw to work back upon the wheels. To overcome this difficulty it is customary in the most approved types of band saw mills to provide one of the wheels (usually the upper one) with adjusting mechanism whereby it can be tilted or inclined in such manner as to give to the cutting edge of the band saw a "lead" so called, toward the log—that is to say, this tilting wheel is inclined in such manner that there shall be a sufficient tendency of the band saw to work toward the log being cut sufficient to resist the drag or strain of the lumber tending to force the band saw backward upon the wheels. With band saw mills employing saws that have teeth upon one edge only the tilting wheel when adjusted, as above described to give the desired "lead" to the saw, is allowed to remain in this position until further variation in adjustment is found desirable; but so far as I am aware no provision has ever heretofore been made for adjusting a wheel of a band saw mill that was adapted to cut the lumber on both the forward and return movement of the carriage; that is to say, a mill having two sets of teeth facing in opposite directions.

The object of my present invention is to provide means for operating the tilting wheel of a band saw having two sets of teeth facing in opposite directions so as to present the saw with the proper "lead" as the log-carriage is making both its forward and return movements.

To this end my invention consists primarily in the combination with a band saw having teeth facing in opposite directions and with a tilting wheel, of means for adjusting said wheel to give the desired "lead" to the saw while it is performing its work during both the forward and backward movements of the log-carriage.

My invention also consists in the various novel features of construction hereinafter described and particularly pointed out in the claims at the end of this specification.

Figure 1 is a view in elevation of a band saw mill having my invention applied thereto, parts being shown in section. Fig. 2 is a view in horizontal section through the hub of a tilting wheel, adjacent parts being shown in plan. Fig. 3 is a view in vertical section through the hub of the tilting wheel on line 3—3 of Fig. 2. Fig. 4 is an end view of one of the journal supports for the tilting wheel. Fig. 5 is a view in vertical section on line 5—5 of Fig. 2. Fig. 6 is a plan view of the log-carriage and its track, parts being broken away for better illustration. Fig. 7 is an enlarged detail plan view of the operating cross head and its slide-way. Fig. 8 is a view in longitudinal section on line 8—8 of Fig. 7. Fig. 9 is an enlarged view in longitudinal section through the cross head and adjacent parts, a portion of the driving rack bar being shown in elevation. Fig. 10 is a view in cross-section on line 10—10 of Fig. 7. Fig. 11 is a view in cross-section on line 11—11 of Fig. 7. Fig. 12 is a perspective view of one end of the double rack-bar.

The band saw A is of the type set forth in Letters Patent, No. 524,135, granted to me August 7, 1894, both of its edges being provided with teeth to cut the lumber on the return as well as on the forward movement of the log-carriage. This band saw A is carried over suitable wheels B and B' that are also shown in my above mentioned Letters Patent, the upper wheel B constituting what may be termed a "shifting wheel," the adjustment of which serves to give the desired "lead" to the band saw. In some band saw mills the shifting wheel B is mounted so that it can be tilted or inclined with respect to the horizontal plane and in other types of band saw mills the shifting wheel is arranged so that it can be inclined or tilted with respect to a vertical plane.

My invention is manifestly applicable to either type of band saw mills although I have shown it in the accompanying drawings as applied to that type in which the shifting wheel is inclined with respect to the vertical plane passing through the axis of the lower wheel. The band wheels B and B' are supported in the usual manner, the upper or shifting wheel B having its axle b carried by the adjustable boxes C and C' that are sustained by the swivel yokes D and D', the vertical stems of which yokes rest within suitable supports e and e' that are sustained by the column E in the usual manner.

The band saw mill will be equipped with the usual devices for reversing the movements of the carriage, for giving the desired tension to the saw, for guiding the saw, &c., but as these features form no part of my present invention, I have not deemed it necessary to describe them or illustrate them in detail in the drawings.

Through one of the boxes C is formed a screw-threaded opening that receives a correspondingly threaded shaft F, the ends of which are journaled in the arms of the yoke D. In similar manner the opposite journal box C is provided with a threaded opening to receive the screw-shaft G, the ends of which are journaled in the yoke D'. In the construction of band saw mills it has heretofore been proposed to provide both of the boxes C and C' with adjusting screws like the screw G, one end of each screw being provided with means whereby it could be turned in or out to incline or adjust the shifting wheel B with respect to a vertical plane passing through the axis of the lower wheel for the purpose of giving the desired "lead" to the saw. With such construction however, it would manifestly be impossible to vary the "lead" of the saw at each backward and forward movement of the log-carriage.

In carrying out my invention I prefer to employ the mechanism to be next described, although this mechanism is simply illustrative of one of the many ways in which the invention can be embodied in practice and I do not wish therefore that the invention shall be understood as restricted to the details of structure set forth.

To one end of the screw-shaft F is fixed a bevel pinion $f$ that meshes with the bevel pinion $f'$ mounted preferably by means of a spline upon the shaft H. By preference the pinion $f'$ is provided with a sleeve whereby it is connected to the yoke D (see Fig. 5), so that as the yoke is raised or lowered under the action of the tension mechanism, a corresponding movement will be imparted to the pinion $f'$ and it will be retained in gear with the pinion $f$. The shaft H which serves to drive the screw-shaft F preferably receives its movements from the log carriage by the mechanism to be presently described, although I wish it understood that the movement may be imparted to this shaft in other ways without departing from the spirit of my invention.

From the foregoing description it will be seen that if it be assumed that the shaft H is turned in one direction just before the log-carriage presents the log to the saw teeth on its forward movement, the saw will be presented to the log with the proper "lead," and if it be assumed that after the forward movement of the log-carriage has been completed and before the opposite teeth of the saw have been presented to the log on the return or "gig" movement of the carriage, the shaft H has had a reversed movement imparted thereto, a corresponding opposite inclination will be given to the shifting wheel B so as to give a corresponding "lead" to the saw while it is cutting the log during the return movement of the carriage.

To the lower end of the shaft H is connected a bevel-pinion $h$ that meshes with the bevel-pinion $h'$ upon the counter-shaft H', this counter-shaft being journaled beneath the main floor as shown in Fig. 1. The outer end of the shaft H' has fixed thereto a pinion $h^2$ that engages with a bevel-wheel $i$ upon the lower end of the rock-shaft I that carries the crank arm I'. To the crank arm I' is connected, (preferably adjustably by the holes $i'$) a pitman K, the opposite end of which is united to a cross-head L that moves within a slide-way M located beneath the log-carriage W. The log-carriage W is provided upon its under side with the downwardly facing double rack-bar P having the reversally arranged racks or teeth $p$ and $p'$. (See Fig. 12.) The cross-head L carries two pawls R and S adapted to engage respectively with the teeth $p$ and $p'$ of the rack-bar P. Preferably the pawls R and S are provided with expanded lower ends that are set within a groove formed in the cross-head L. (See Fig. 9.) These pawls or dogs are forced normally upward by suitable coil springs 2 that encircle the stems 3 passing upward through the bottom of the cross-head and into the pawls as shown in Figs. 9 and 11. Upon the slide-way M are mounted and preferably in adjustable manner, the releasing arms or triggers T and T' that are carried by the cross-heads $t$ and $t'$ as shown. (See Fig. 6.) The triggers T and T' extend at opposite sides of the rack-bar P and the pawls R and S also project beyond the sides of the rack-bar so as to be engaged by the triggers. In order to save strain upon the arm I', I prefer to provide the rock-shaft I with a stud or projection $i^2$ that will extend between cushions $i^3$ that are held within the hub $i^4$ of the arm I'. It will thus be seen that when the arm I' is suddenly shifted the cushions $i^3$ will alternately bear upon the projections $i^2$ on the rock-shaft I and cause the shaft to be shifted without strain.

The operation of the parts above described will be seen to be as follows, it being assumed of course that there is a log upon the carriage W and that this log has been placed in proper position by means of suitable "set works" (not shown): It will be understood of course that the log-carriage both upon its forward and return movements, travels a slight distance beyond the teeth of the band saw A, so that the inclining or tilting of the wheel B will be effected in manner to be presently described, in order to give the proper "lead" to the saw before it begins to cut the log. Assuming that there is a log upon the carriage W and that the carriage is in position to begin its forward movement, the cross-head L will be in the retracted position shown in Fig. 6, to which position it has been moved during the first part of the preceding "gig" movement of the carriage. The log at the beginning of the forward movement of the carriage will be at such distance from the band saw A that the movement of the shifting wheel to be next described will be effected before the saw teeth enter the log. As the carriage moves forward one of the teeth $p'$ of the rack-bar P will engage with the pawl S which at such time will be in elevated position, but the teeth $p'$ of the adjacent rack-bar will ride freely over the pawl R. The engaging of the pawl S by the rack $p'$ will cause the cross-head L to be shifted to a position the reverse of that shown in Fig. 6 of the drawings, that is to say, the cross-head L will be shifted to the opposite end of the slide-way M and will be carried by the rack $p'$ until the pawl S contacts with the inclining under face of the releasing arm or trigger T' which will depress the pawl S and cause it to be instantly released so as to permit the carriage to continue its forward movement without further movement of the cross-head. This forward movement of the cross-head will shift the rock-shaft I causing the gear pinions $i$ and $h^2$ to impart movement to the counter-shaft H' and the shaft H and this movement of the shaft H will turn the screw-shaft F so as to move the box C in one direction and thus effect the desired inclination or shift of the wheel B necessary to give the desired "lead" to the saw. After the log-carriage W has effected its forward movement and has carried the log a slight distance beyond the saw, the return or "gig" movement of the carriage will begin; but before the log is presented to the saw upon its return or "gig" movements the rack-teeth $p$ will engage with the pawl R and shift the cross-head L to the position shown by Fig. 6 of the drawings and this shift of the cross-head L will occur before the log is engaged with the saw-teeth. As soon as the cross-head L approaches the position shown by Fig. 6 the pawl R will ride against the under face of the releasing arm or trigger T which will force the pawl downward and release it from engagement with the rack $p$. It will thus be seen that at the beginning of each forward and return movement of the log-carriage the shifting wheel B will be inclined so as to give the desired "lead" to the saw.

My object in providing a log-carriage with a rack-bar of considerable length is to insure the operation of the cross-head whether the carriage be making a long or short travel.

It is manifest that the details of construction above set out may be varied widely without departing from the spirit of the invention.

Having thus described the invention, what I claim as new, and desire to secure by Letters Patent, is—

1. In a band saw mill, the combination with a band saw having two sets of teeth facing in opposite directions and with suitable band wheels for sustaining said saw, of means for oppositely inclining one of said wheels in keeping with the forward and return movements of the log-carriage in order to give the proper "lead" to the saw as its opposite sets of teeth are brought into operation.

2. In a band saw mill, the combination with a band saw having two sets of teeth facing in opposite directions and with suitable band wheels for sustaining said saw, one of said wheels being provided with shifting mechanism (such for example as a screw-shaft), whereby said wheel may be inclined, of gear mechanism connecting said shifting mechanism with some movable part of the mill, whereby said shifting mechanism may be operated to impart the desired inclination to the saw during both the forward and return movements of the carriage.

3. In a band saw mill, the combination with a band saw having two sets of teeth facing in opposite directions and with suitable band wheels for sustaining said saw, one of said wheels being provided with shifting mechanism (such for example as a screw-shaft), whereby said wheel may be inclined, of gear mechanism connecting said shifting mechanism with the log-carriage whereby as said carriage is moved back and forth a corresponding reversal of the inclination of the shifting wheel will be effected to give the desired "lead" to the saw.

4. In a band saw mill the combination with a band saw having two sets of teeth facing in opposite directions and with suitable band wheels for sustaining said saw, one of said wheels being provided with shifting mechanism whereby said wheel may be inclined and gear mechanism connecting said shifting mechanism with some movable part of the mill, whereby said shifting mechanism may be operated to impart the desired inclines to the saw during both the forward and return movements of the carriage and suitable means for checking the operation of said shifting mechanism before the saw begins its cut.

5. In a band saw mill, the combination with a band saw having two sets of teeth facing in opposite directions and with suitable band wheels for sustaining said saw, one of said wheels being provided with shifting mechanism whereby said wheel may be inclined, of gear mechanism connecting said shifting mechanism with the log-carriage, and suitable means for automatically disengaging the log-carriage from said gear mechanism before the saw begins its cut and after the desired inclination has been given to the shifting wheel.

6. In a band saw mill, the combination with a band saw having two sets of teeth facing in opposite directions and with suitable band wheels for sustaining said saw, one of said wheels being provided with shifting mechanism (such for example as a screw-shaft) whereby said wheel may be inclined, of gear mechanism for connecting said shifting mechanism with the log-carriage, said gear mechanism comprising pawl and ratchet mechanism whereby connection may be automatically made and broken with the saw-carriage during its forward and backward movements.

7. In a band saw mill the combination with a band saw having teeth facing in opposite directions, and with suitable wheels for carrying said saw, one of said wheels being mounted in a movable support, of a screw-shaft connected to said support and provided with a pinion, suitable gears and shafting connected with said screw-shaft, a rock shaft mounted adjacent the log carriage, a pitman connected to said rock shaft and pawl and ratchet mechanism for driving said pitman from the log carriage, substantially as described.

CHARLES EDGAR.

Witnesses:
FRED GERLACH,
ALBERTA ADAMICK.